United States Patent
Kim et al.

(10) Patent No.: US 8,164,704 B2
(45) Date of Patent: Apr. 24, 2012

(54) LIQUID CRYSTAL DISPLAY DEVICE

(75) Inventors: Nam-Su Kim, Daegu (KR); Chung-Oan Seo, Busan (KR)

(73) Assignee: LG Display Co., Ltd., Seoul (KR)

( * ) Notice: Subject to any disclaimer, the term of this patent is extended or adjusted under 35 U.S.C. 154(b) by 195 days.

(21) Appl. No.: 12/793,086

(22) Filed: Jun. 3, 2010

(65) Prior Publication Data
US 2011/0007236 A1    Jan. 13, 2011

(30) Foreign Application Priority Data
Jul. 9, 2009   (KR) .......................... 10-2009-0062459

(51) Int. Cl.
*G02F 1/1333* (2006.01)
(52) U.S. Cl. ............ 349/58; 349/161; 362/612; 362/631
(58) Field of Classification Search .................. 362/612, 362/631
See application file for complete search history.

(56) References Cited

U.S. PATENT DOCUMENTS
7,922,380 B2 *  4/2011  Park .............................. 362/631
* cited by examiner

*Primary Examiner* — Richard Kim
(74) *Attorney, Agent, or Firm* — Morgan, Lewis & Bockius LLP

(57) ABSTRACT

A liquid crystal display device includes a liquid crystal panel; a light guide plate disposed under the liquid crystal panel; a light emitting diode (LED) assembly disposed at a side of the light guide plate and including an LED and a printed circuit board (PCB), the LED arranged on the PCB to face the light guide plate; an LED heat sink surrounding the LED assembly and including a first portion, where the PCB is attached, and a second portion covering a bottom surface of the PCB; a bottom frame disposed under the light guide plate and including a bottom portion and a side portion, the bottom portion contacting the second portion of the LED heat sink, the bottom frame formed of an electrolytic galvanized iron (EGI); a top frame surrounding edges of the liquid crystal panel; and a main frame surrounding sides of the liquid crystal panel and combining with the top and bottom frames.

15 Claims, 6 Drawing Sheets

LIQUID CRYSTAL DISPLAY DEVICE

The present invention claims the benefit of Korean Patent Application No. 10-2009-0062459 filed in Korea on Jul. 9, 2009, which is hereby incorporated by reference.

BACKGROUND OF THE INVENTION

1. Field of the Invention

The invention relates to a liquid crystal display (LCD) device, and more particularly, to an LCD device including a light emitting diode (LED) as a light source.

2. Discussion of the Related Art

The liquid crystal display (LCD) devices are widely used for notebook computers, monitors, TV, and so on, because of their high contrast ratio and characteristics adequate to display moving images. The LCD devices use optical anisotropy and polarization properties of liquid crystal molecules to display images.

The LCD devices require a liquid crystal panel including first and second substrates and a liquid crystal layer interposed therebetween. An arrangement of the liquid crystal molecules in the liquid crystal layer is changed by an electric field induced in the liquid crystal panel to control light transmissivity.

Generally, an additional light source is required because the liquid crystal panel is a non-emissive-type display device. Accordingly, a backlight unit is disposed under the liquid crystal panel. The LCD device displays images using light produced by the backlight unit and supplied to the liquid crystal panel. A cold cathode fluorescent lamp (CCFL), an external electrode fluorescent lamp and a light emitting diode (LED) are used as a light source of the backlight unit. Among these light sources, the LEDs are widely used because of advantages in a size, power consumption and reliability.

FIG. 1 a cross-sectional view of the related art LCD device using an LED as a light source. Referring to FIG. 1, the LCD device includes a liquid crystal panel 10, a backlight unit 20, a main frame 30, a bottom frame 50 and a top frame 40. The liquid crystal panel 10 includes first and second substrates 12 and 14 facing each other and a liquid crystal layer (not shown) therebetween. First and second polarizing plates 19a and 19b for controlling a polarization direction of light, are respectively disposed at front and rear sides of the liquid crystal panel 10.

The backlight unit 20 is disposed at a rear side of the liquid crystal panel 10. The backlight unit 20 includes an LED assembly 29 arranged along a length direction of at least one edge of the main frame 30, a reflective sheet 25 of white or silver color on the bottom frame 50, a light guide plate 23 on the reflective sheet 25 and an optical sheet 21 on the light guide plate 23. The LED assembly 29 is positioned at one side of the light guide plate 23 and includes at least one LED 29a emitting white light and an LED printed circuit board (PCB) 29b where the LED 29a is disposed. The optical sheet 21 includes a plurality of sheets.

The liquid crystal panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

FIG. 2 is an enlarged cross-sectional view of an "A" portion in FIG. 1. Referring to FIG. 2 with FIG. 1, the LED 29a is positioned at one side of the light guide plate 23 and arranged on the PCB 29b. The LED 29a has a fixed position and faces a side portion of the light guide plate 23 such that light emitted from the LED 29a is projected to the light guide plate 23. To provide a space for the LED assembly 29, the bottom frame 50 has a bending portion. Namely, the bottom frame 50 is bent upwardly. The LED assembly 29 is fixed in the bending portion of the bottom frame 50 using an element, for example, a double coated tape. The above backlight unit may be called as a side top-view type.

The light emitted from the LED 29a is projected to the light guide plate 23 and refracted or reflected to be projected onto the liquid crystal panel 10. The light is processed into an uniform plane light source during passing the optical sheet 21.

On the other hand, a temperature of the LED 29a is rapidly increasing with an operating time. The temperature increasing of the LED 29a causes problems in a lifetime and brightness uniformity of the LED 29a. Accordingly, when using the LED 29a as a light source, it is very important to provide a heat-radiating member for the LED 29a.

However, since there is no heat-radiating member for the LED in the conventional LCD device, a temperature increasing problem in the LED is generated with an operation. Accordingly, there are disadvantages in a lifetime, brightness uniformity and displaying image quality in the LCD device using the LED.

To resolve these problems, a metal core printed circuit board (MCPCB) having a heat-radiating property is used for the LED PCB 29b, and the bottom frame 50 is formed of a high thermal conductive material, for example, aluminum (Al). Unfortunately, there is a disadvantage in production costs.

SUMMARY OF THE INVENTION

Accordingly, embodiments of the invention are directed to an LCD device that substantially obviates one or more of the problems due to limitations and disadvantages of the related art.

An object of the invention is to provide an LCD device being capable of effectively radiating heat from the LED.

Another object of the invention is to provide an LCD device having lower production costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a liquid crystal display device includes a liquid crystal panel; a light guide plate disposed under the liquid crystal panel; a light emitting diode (LED) assembly disposed at a side of the light guide plate and including an LED and a printed circuit board (PCB), the LED arranged on the PCB to face the light guide plate; an LED heat sink surrounding the LED assembly and including a first portion, where the PCB is attached, and a second portion covering a bottom surface of the PCB; a bottom frame disposed under the light guide plate and including a bottom portion and a side portion, the bottom portion contacting the second portion of the LED heat sink, the bottom frame formed of an electrolytic galvanized iron (EGI); a top frame surrounding edges of the liquid crystal panel; and a main frame surrounding sides of the liquid crystal panel and combining with the top and bottom frames.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
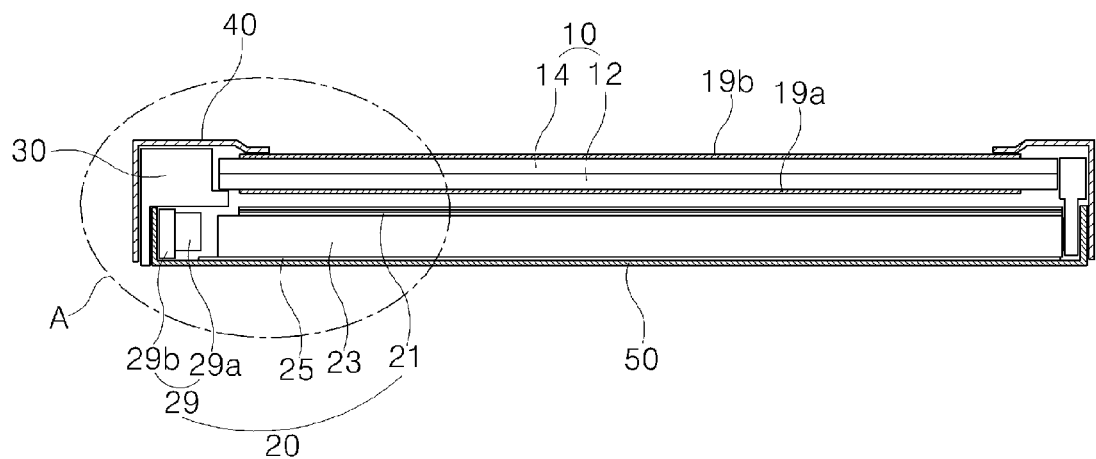
FIG. 1 a cross-sectional view of the related art LCD device using an LED as a light source.
Figure 2:
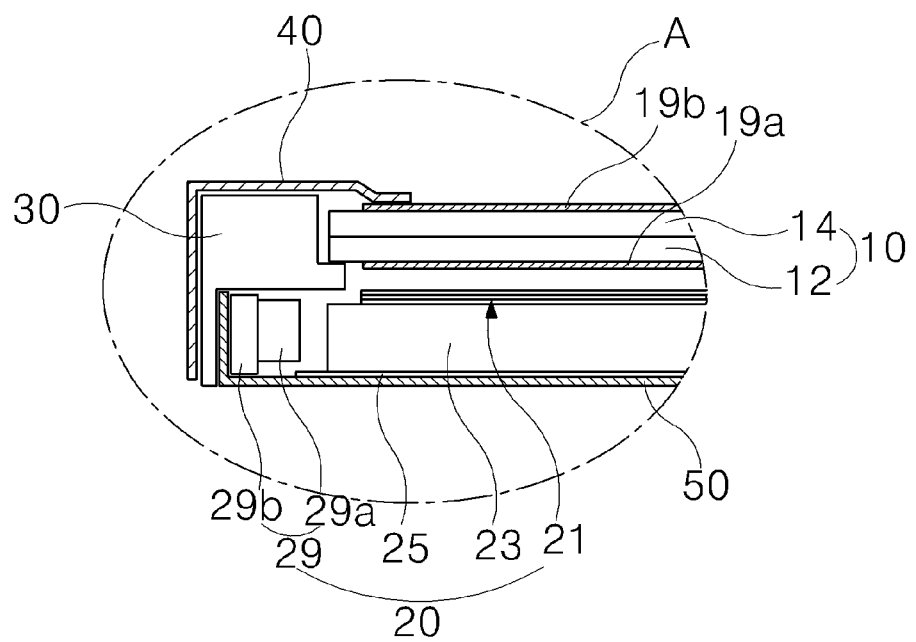
FIG. 2 is an enlarged cross-sectional view of an "A" portion in FIG. 1.
Figure 3:
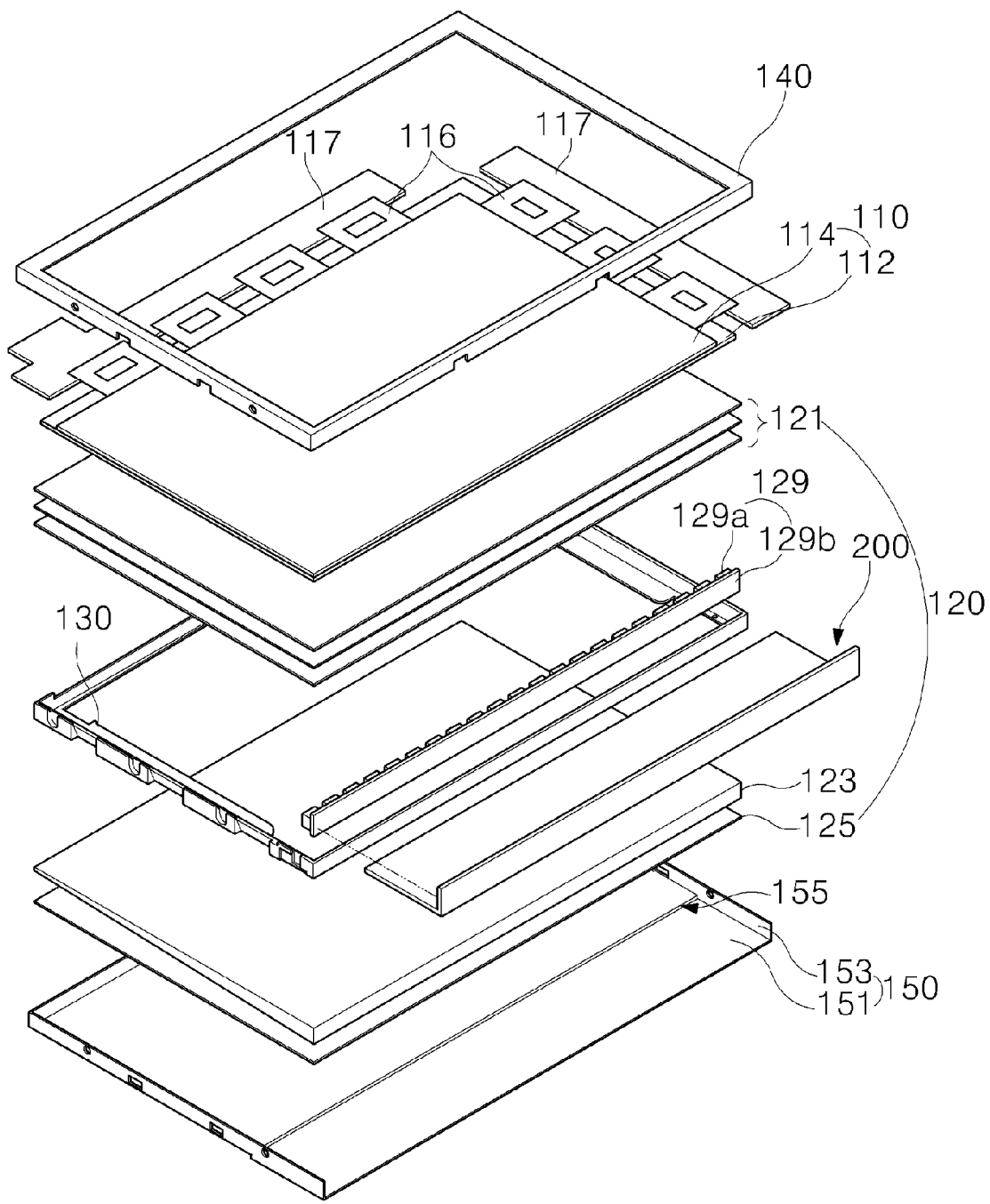
FIG. 3 an explode perspective view of an LCD device according to the present invention.

FIG. 3 an explode perspective view of an LCD device according to the present invention. Referring to FIG. 3, an LCD device includes a liquid crystal panel 110, a backlight unit 120, a main frame 130, a bottom frame 150 and a top frame 140.

The liquid crystal panel 110 includes first and second substrates 112 and 114 facing each other and a liquid crystal layer (not shown) therebetween. In an active matrix type, array elements, for example, a gate line (not shown), a data line (not shown), a thin film transistor (not shown) and a pixel electrode (not shown), are formed on the first substrate 112. The gate and data lines cross each other to define a pixel region, and the thin film transistor is formed at a crossing portion of the gate and data lines. The pixel electrode is disposed in the pixel region and connected to the thin film transistor. In addition, a black matrix (not shown) corresponding to the gate line, the data line and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112. Moreover, first and second polarizing plates for selectively transmitting light are positioned on outer sides of the first and second substrates 112 and 114.

The liquid crystal panel 110 is connected to a driving printed circuit board (PCB) 117 through a connection member 116 that provide a scanning signal and an image signal to the liquid crystal panel 110, respectively. The driving printed circuit board 117 extends along end portions of a bottom frame 150 of the backlight unit 120, respectively, as dummy spaces. When the thin film transistor has an ON state by the scanning signal from a gate driving circuit, the image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using the controlled transmissivity, the backlight unit 120 providing light to the liquid crystal panel 110 is disposed at a rear side of the liquid crystal panel 110. The backlight unit 110 includes an LED assembly 129 as a light source, a reflective sheet 125 of white or silver color on the bottom frame 150, a light guide plate 123 on the reflective sheet 125, an optical sheet 121 including two or three sheets on the light guide plate 123, and an LED heat sink 200. The LED assembly 129 is positioned at one side of the light guide plate 123 and includes at least one LED 129a and an LED printed circuit board (PCB) 129b where the LED 29a is disposed. The optical sheet 121 includes a plurality of sheets. The LEDs 129a emits red, green and blue color light. The LEDs 129a are arranged on the LED PCB 129b in one row or at least two parallel rows. The LEDs 129a are simultaneously turned on and off such that white light can be provided from the LEDs 129a by color mixture. Alternatively, by using an LED chip (not shown) emitting all of red, green and blue color light instead of each LED 129a, white light can be emitted from each LED chip. Alternatively, by using an LED chip (not shown) emitting white color light as well as red, green and blue color light, each LED chip can emitted pure white color light. Alternatively, an LED cluster including a plurality of LED may be used.

As mentioned above, a temperature of the LED is rapidly increasing with an operating time. The temperature increasing of the LED causes problems in a lifetime and brightness uniformity of the LED. Accordingly, when using the LED as a light source, it is very important to provide a heat-radiating member for the LED.

In the present invention, even if the LED 129a is operated for a long time, a temperature increasing of the LED 129a is minimized due to the LED heat sink 200. The LED heat sink 200 is formed of a metallic material and covers an outer side of the LED assembly 129. The heat from the LED 129a is easily radiated due to the LED heat sink 200 such that a temperature increasing of the LED 129a can be minimized. The LED heat sink 200 will be explained below in more detail.

The light emitted from the LED 129a is projected to the light guide plate 123 and refracted or reflected to be dispersed onto a wide region of the light guide plate 123. The light is processed into a plane light source.

To provide an uniform plane light source, the light guide plate 123 includes patterns on a rear side surface. For example, the pattern on the rear side surface of the light guide plate 123 is one of an elliptical pattern, a polygonal pattern and a hologram pattern. The patterns are formed on the rear side surface by a printing method or an injection molding method.

The reflective sheet 125 is disposed at a rear side of the light guide plate 123. The light passing through a rear side surface of the light guide plate 123 is reflected on the reflective sheet 125 such that light brightness provided into the liquid crystal panel 110 is improved.

The optical sheet 121 on the light guide plate 123 includes a diffusion sheet and at least one light-concentration sheet. The light through the light guide plate 123 is diffused or/and concentrated by the optical sheet 121 such that an uniform plane light source can be projected onto the liquid crystal panel 110.

The liquid crystal panel 110 and the backlight unit 120 are combined using the main frame 130 that can prevent movement of the liquid crystal panel 110 and the backlight unit 120. The top frame 140 cover edges of the liquid crystal panel 110 and sides of the main frame 130, so the top frame 140 can support and protect of the edges of the liquid crystal panel 110 and sides of the main frame 130. The top frame 140 includes an opening, which exposes a center of the liquid crystal panel 110, to display images. The main frame 130 surrounds sides of the liquid crystal panel 110. The bottom frame 150 covers back edges of the main frame 130, so the bottom frame 150 is combined with the main frame 130 and the top frame 140 for modulation.

The bottom frame 150 includes a bottom portion 151 and three side portions 153. The side portions 153 upwardly extend from the bottom portion 151, respectively, to be vertical to the bottom portion 151. Namely, one side of the bottom frame 150 is opened. The bottom portion 151 has a single step difference 155. Namely, the bottom portion 151 has a single terraced or stair shape.

The LED heat sink 200 is disposed on a lower portion of the single terraced shape of the bottom portion 151 such that a portion of the LED heat sink 200 serves as another side portion for the bottom frame 150. Namely, the LED heat sink 200 covers the opened side of the bottom frame 150. As a result, a width of a bezel of the LCD device can be reduced. Namely, the LCD device according the present invention has a narrow bezel.

The bottom frame 150 is obtained by pressing and deforming a mother plate. Namely, the bottom frame 150 is obtained by a press process. The bottom frame 150 is formed of an electrolytic galvanized iron (EGI) which has an advantage in cost. Accordingly, production costs of the LCD can be reduced.

The main frame 130 is disposed on the bottom frame 150 and surrounds edges of the liquid crystal panel 110 and the backlight unit 120. The main frame 130 combined with the top frame 140 and the bottom frame 150.

The above backlight unit 120 may be referred to as a side light type. The LEDs 129a may be arranged in a plurality of rows on the LED PCB 129b. Another LED assembly 129 may be disposed at an opposite side.

Figure 4:
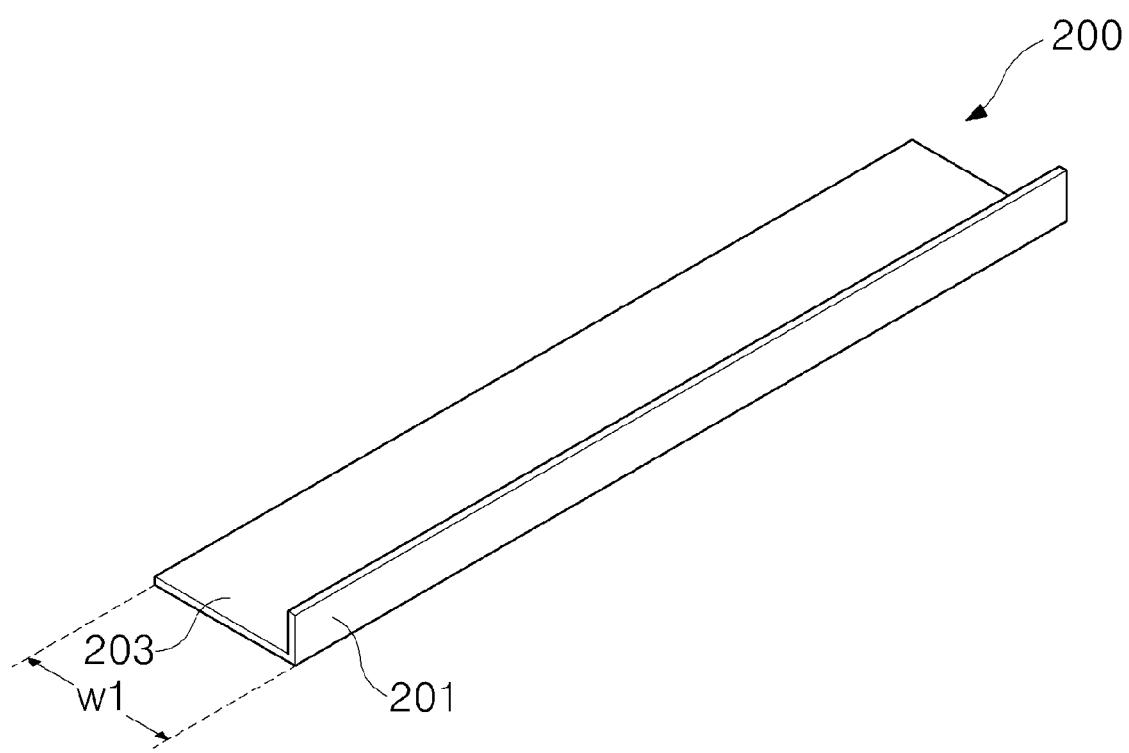
FIG. 4 is a perspective view of an LED heat sink according to a first embodiment of the present invention.

FIG. 4 is a perspective view of an LED heat sink according to a first embodiment of the present invention. The LED heat sink 200 serves as a side portion of the bottom frame 150 for protecting and supporting the LED assembly 129. In addition, heat from the LED 129 is easily radiated due to the LED heat sink 200.

The LED heat sink 200 includes a first portion 201, where the LED assembly 129 (of FIG. 3) is attached, and a second portion 203 which is substantially vertical to the first portion 201 and contacting the bottom portion 151 (of FIG. 3) of the bottom frame 150 (of FIG. 3). Namely, the first portion 201 covers the opened side of the bottom frame 150, and the second portion 203 is disposed on the lower portion of the single terraced shape. The LED heat sink 201 has an "L" shape to cover one side surface and a bottom surface of the LED assembly 129.

The first portion 201 of the LED heat sink 200 has a length being substantially equal to the LED assembly 129. The second portion 203 of the LED heat sink 200 has a first width w1 to cover an entire bottom surface of the LED assembly 129 and a portion of the reflective sheet 125 (of FIG. 3) or the light guide plate 123 (of FIG. 3). In addition, the second portion 203 contacts an entire surface of the lower portion of the bottom portion 151 of the bottom frame 150. As the second portion 203 of the LED heat sink 200 has larger area, the heat from the LED 129a is much easily radiated.

The LED heat sink 200 is formed of a metallic material having a high thermal conductive property. For example, the LED heat sink 200 is formed of aluminum (Al) having high purity of about 99.5%. The LED heat sink 200 may be processed by an anodizing process such that an oxidation film of black is formed on their surfaces. In this case, the LED heat sink 200 can powerfully absorb the heat from the LED 129a. The heat from the LED 129a is dispersed into an entire of the LED heat sink 200 to radiate it into an outer space.

Figure 5:
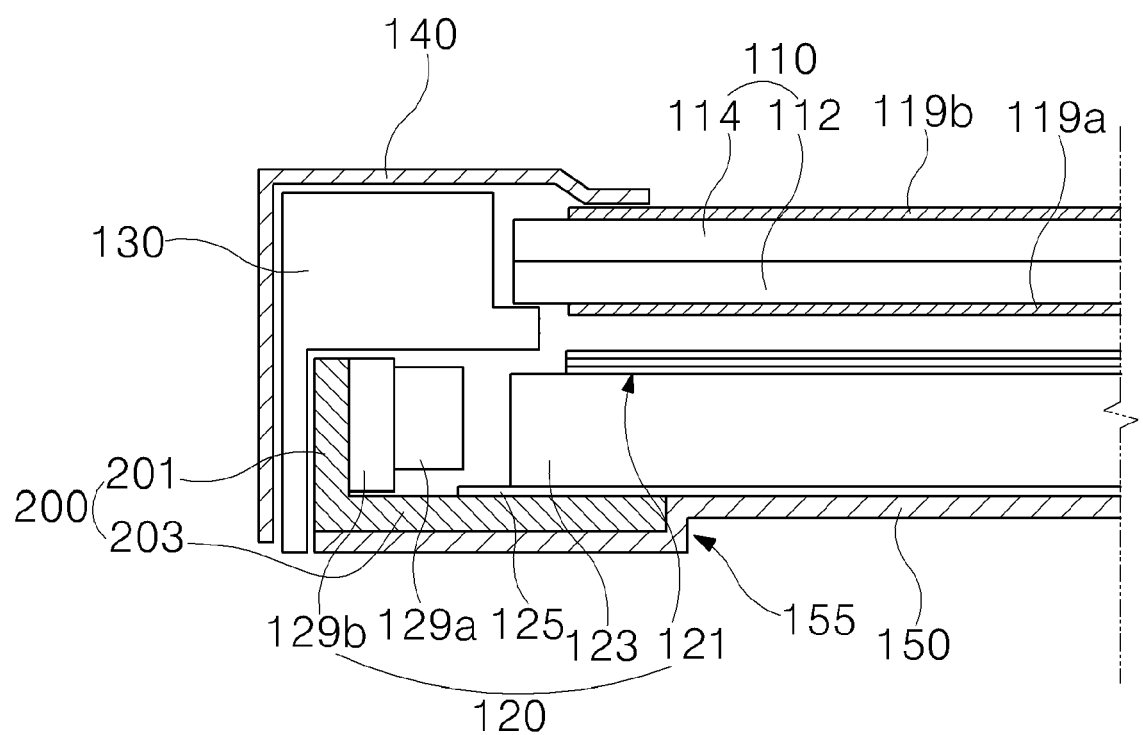
FIG. 5 is a cross-sectional view of a portion in FIG. 3.

FIG. 5 is a cross-sectional view of a portion in FIG. 3. Referring to FIG. 5, the reflective sheet 125, the light guide plate 123 on the reflective sheet 125, the LED assembly 129 at a side of the light guide plate 123, the optical sheet 121 on the light guide plate 123, and the LED heat sink 200 covering the LED assembly 129 constitute the backlight unit 120.

The liquid crystal panel 110, which includes the first and second substrates 112 and 114 and the liquid crystal layer, is disposed over the backlight unit 120. The first and second polarizing plates 119a and 119b for selectively transmitting light are positioned on outer sides of the first and second substrates 112 and 114.

The sides of the backlight unit 120 and the liquid crystal panel 110 are surrounded by the main frame 130. The bottom frame 150 covers the rear side of the backlight unit 120, and the top frame 140, which covers edges of the liquid crystal panel 110, is combined with the main frame 130 and the bottom frame 150.

FIG. 5 shows a single LED 129a. However, a plurality of LEDs 129a are arranged on the LED PCB 129b to be spaced apart from each other. The LEDs 129a receive a driving signal from an external driving circuit.

The LED PCB 129b includes an insulating base of a resin or a ceramic and an electric line on the insulating base. Recently, to effectively radiate heat from the LED 129a, a metal core printed circuit board (MCPCB) is widely used. In this case, an insulating layer of polyimide resin, for an electrical insulation of the electric line and the MCPCB is required.

The LED heat sink 200 includes the first portion 201, where the LED assembly 129 (of FIG. 3) is attached, and the second portion 203 which is substantially vertical to the first portion 201 and contacting the bottom portion 151 (of FIG. 3) of the bottom frame 150 (of FIG. 3). The LED assembly 129 is attached on the first portion 201 of the LED heat sink 200 using an element, for example, a double coated tape. The first portion 201 covers the opened side of the bottom frame 150, and the second portion 203 is disposed on the lower portion of the single terraced shape. The LED heat sink 201 has an "L" shape to cover one side surface and a bottom surface of the LED assembly 129.

The second portion 203 of the LED heat sink 200 has a first width w1 to cover an entire bottom surface of the LED assembly 129 and a portion of the reflective sheet 125 (of FIG. 3) or the light guide plate 123 (of FIG. 3). In addition, the second portion 203 contacts an entire surface of the lower portion of the bottom portion 151 of the bottom frame 150. The heat from the LED 129a is transferred to the LED heat sink 200 through the LED PCB 129b of the MCPCB and is transferred to the bottom frame 150 which contacts the LED heat sink 200. As a result, the heat is radiated into an outer space. Namely, the heat from the LED 129a is effectively radiated into the outer spaced due to the LED heat sink 200 such that the problems in a lifetime and brightness uniformity because of the heat from the LED 129a are prevented.

In addition, the first portion 201 of the LED heat sink 200 serves as a side surface of the bottom frame 150, a narrow bezel type LCD device can be obtained.

Furthermore, to prevent an uneven surface resulted by the second portion 203 of the LED heat sink 200, the bottom portion 151 of the bottom frame 150 has a single terraced shape, and the second portion 203 of the LED heat sink 200 is disposed on the lower portion of the bottom frame 151 of the bottom frame 150 to provide a flat top surface. Namely, an end of the second portion of the LED heat sink corresponds to a boundary of the lower portion of an upper portion of the single terraced shape to form a flat top surface.

Figure 6:
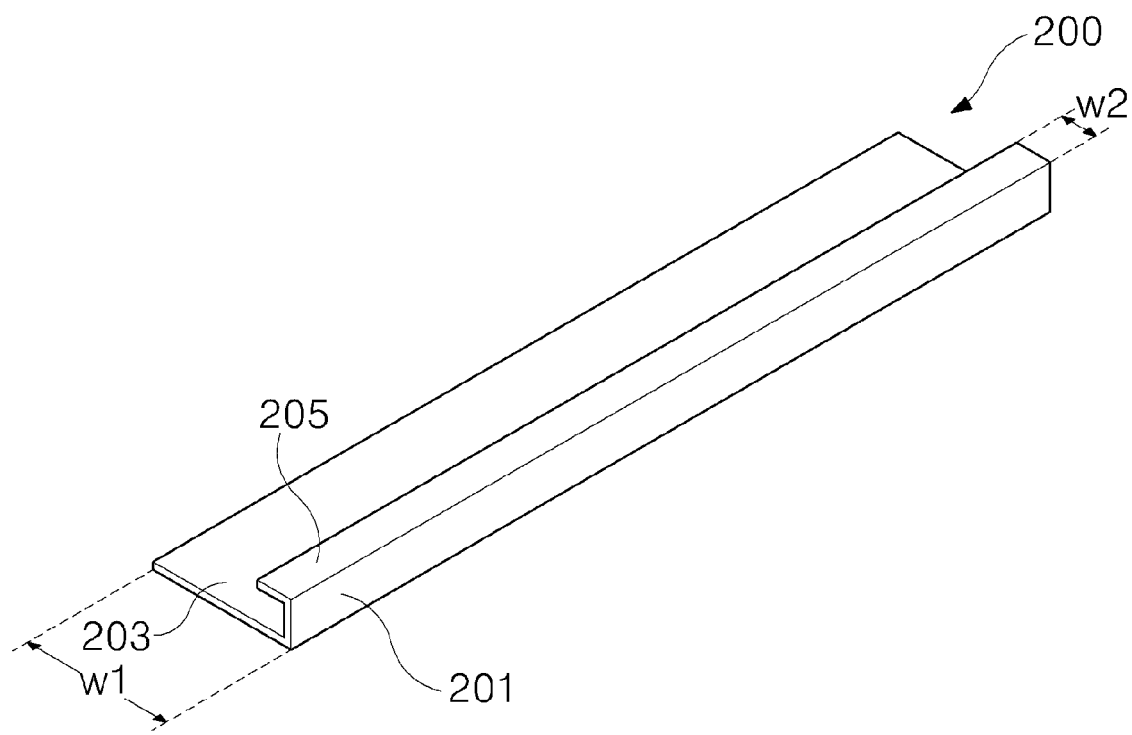
FIG. 6 is a perspective view of an LED heat sink according to a second embodiment of the present invention.

FIG. 6 is a perspective view of an LED heat sink according to a second embodiment of the present invention. Referring to FIG. 6, the LED heat sink 200 includes a first portion 201, where the LED assembly 129 (of FIG. 3) is attached, a second portion 203, which is substantially vertical to the first portion 201 and contacting the bottom portion 151 (of FIG. 3) of the bottom frame 150 (of FIG. 3), and a third portion 205 which is substantially vertical to the first portion 201 and parallel to the second portion 203. Namely, the first portion 201 of the LED heat sink 200 covers a side surface of the LED assembly 129, and the second and third portions 203 and 205 of the LED heat sink 200 respectively cover bottom and top surface of the LED assembly 129. In other words, the LED heat sink 200 has a "C" shape.

The first portion 201 of the LED heat sink 200 has a length corresponding to the LED assembly 129. The second portion 203 of the LED heat sink 200 has a first width w1 to cover an entire bottom surface of the LED assembly 129 and a portion of the reflective sheet 125 (of FIG. 3) or the light guide plate 123 (of FIG. 3). In addition, the second portion 203 contacts an entire surface of the lower portion of the bottom portion 151 of the bottom frame 150. As the second portion 203 of the LED heat sink 200 has larger area, the heat from the LED 129a is much easily radiated.

The third portion 205 of the LED heat sink 200 has a second width w2 to cover an entire top surface of the LED assembly and an edge of the light guide plate 123. As a result, the light from the LED 129a is effectively provided into the light guide plate 123. Namely, light leakage through a space between the LED assembly 129 and the light guide plate 123 is prevented by the third portion 205 of the LED heat sink 200.

Following table 1 shows a simulation result of LCD devices including various heat-radiating structures.

TABLE 1

|  | a temperature of a bottom frame [° C.] | a temperature of an LED [° C.] | a lifetime of an LED [hour] |
| --- | --- | --- | --- |
| sample 1 | 67 | 81 | 29000 |
| sample 2 | 54 | 67 | 56000 |
| sample 3 | 57 | 70 | 49000 |
| sample 4 | 52 | 65 | 62000 |

In the table 1, the LCD device in the sample 1 includes only a bottom frame of EGI without an LED heat sink for heat-radiating, and the LCD device in the sample 2 includes only a bottom frame of Al without an LED heat sink for heat-radiating. The LCD device in the sample 3 includes only LED heat sink for heat-radiating without a bottom frame, and the LCD device in the sample 4 includes both an LED heat sink and a bottom frame of EGI for heat-radiating.

As shown in the table 1, there is an advantage in a heat-radiating property in the LCD device of sample 2 rather than that of sample 1. However, there is a disadvantage in the LCD device of sample 2 because of the bottom frame of Al. In the LCD device of sample 4, a heat-radiating property is most excellent and there is no disadvantage in the production costs because the bottom frame is formed of EGI. Namely, when the LED heat sink 200 is used for heat-radiating with the bottom frame 150 of EGI, there are advantages in the heat-radiating property as well as the production costs. In addition, there is another advantage in a lifetime of the LED 129a.

Table 2 shows a simulation result of brightness of the backlight unit including various heat-radiating structures.

TABLE 2

|  | Brightness of a backlight unit [%] | a temperature of an LED [° C.] | a lifetime of an LED [hour] |
| --- | --- | --- | --- |
| sample 5 | 100 | 81 | 29000 |
| sample 6 | 104 | 67 | 56000 |
| sample 7 | 103 | 70 | 49000 |
| sample 8 | 105 | 65 | 62000 |

In the table 2, the LCD device in the sample 5 includes only a bottom frame of EGI without an LED heat sink for heat-radiating, and the LCD device in the sample 6 includes only a bottom frame of Al without an LED heat sink for heat-radiating. The LCD device in the sample 7 includes only LED heat sink for heat-radiating without a bottom frame, and the LCD device in the sample 8 includes both an LED heat sink and a bottom frame of EGI for heat-radiating.

Among the samples 5 to 8, the temperature of the LED in the sample 8 is lowest, and the brightness of the backlight unit is highest. Namely, when the LED heat sink 200 is used for heat-radiating with the bottom frame 150 of EGI, there are advantages in the brightness as well as the temperature of the LED 129a. In addition, there is another advantage in a lifetime of the LED 129a.

As mentioned above, by providing the bottom frame 150 of EGI and the LED heat sink 200 for covering the LED assembly 129, the heat from the LED 129a is easily and effectively radiated into an outer space through the LED heat sink 200 and the bottom frame 150. As a result, the problems in a lifetime and brightness uniformity because of the heat from the LED 129a are prevented.

Figure 7A:
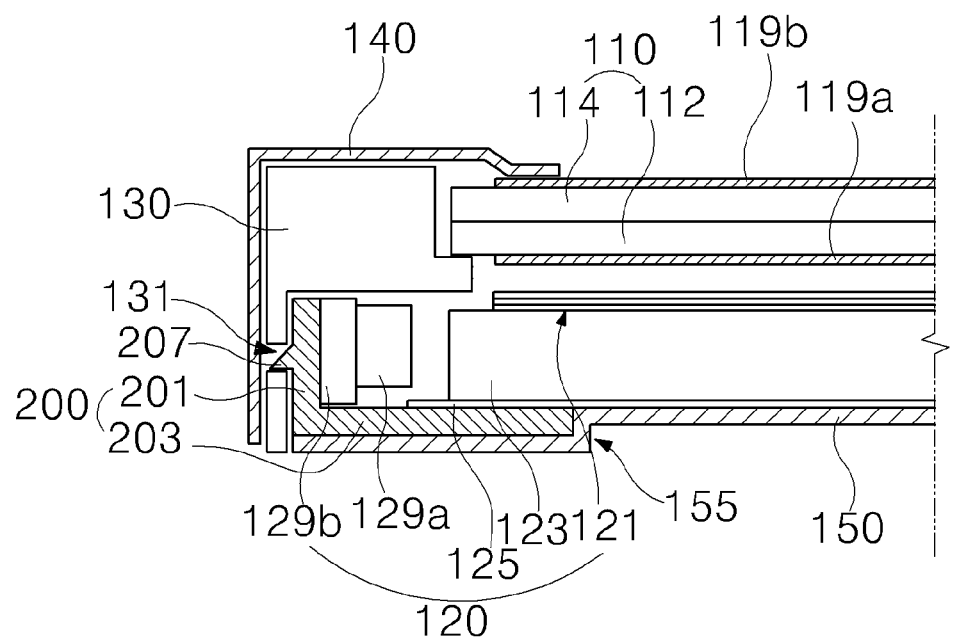
FIGS. 7A to 7C are cross-sectional view showing a fixed form of an LED heat sink, respectively.
Figure 7B:
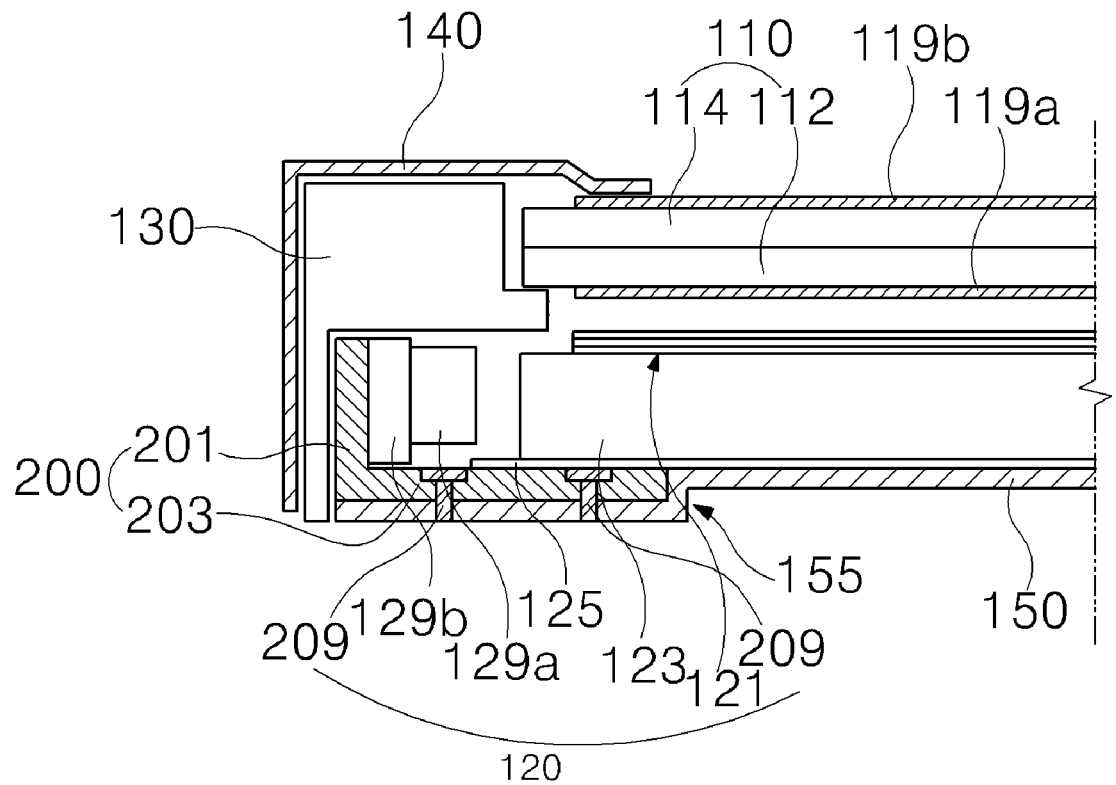
Figure 7C:
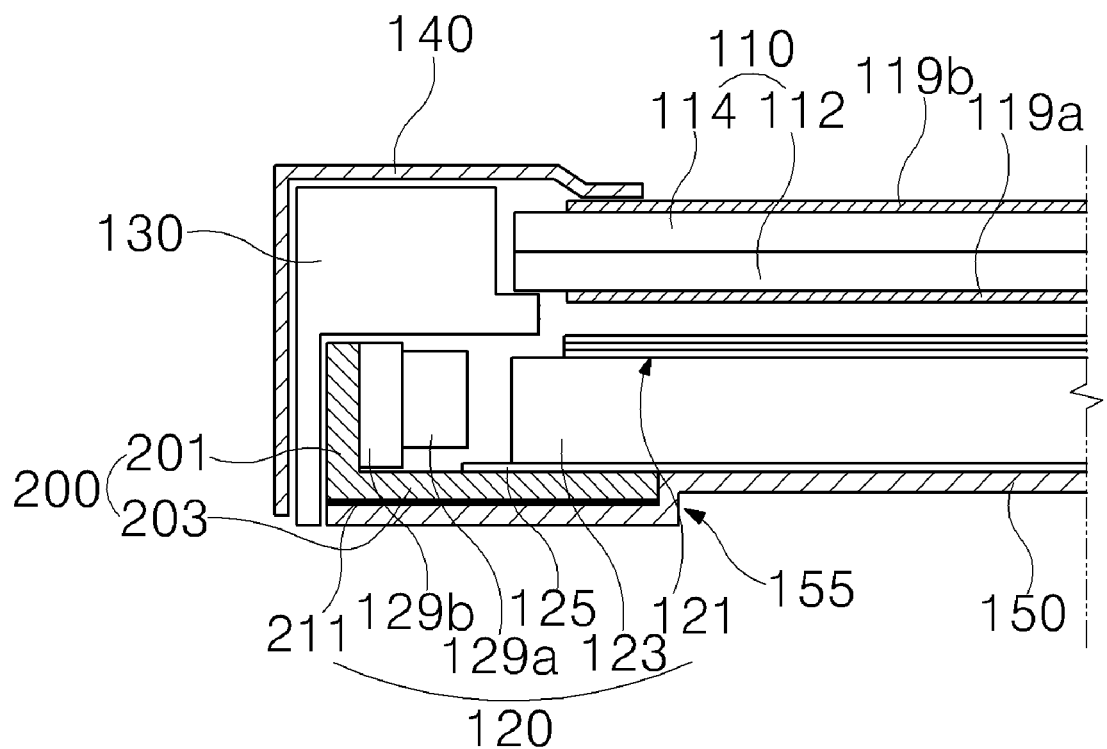

FIGS. 7A to 7C are cross-sectional view showing a fixed form of an LED heat sink, respectively.

Referring to FIG. 7A, the LED heat sink 200 further includes a hook 207 extending from the first portion 201. In addition, the main frame 130 includes a hook hole 131 corresponding to a position of the hook 207. The hook 207 is inserted into the hook hole 131 such that the LED heat sink 200 is combined with the main frame 130.

Alternatively, referring to FIG. 7B, the LED heat sink 200 further includes a first through-hole on the second portion 203. In addition, the bottom frame 150 further includes a second through-hole on the lower portion of the bottom portion 151. A fixing element 209, for example, a screw, is inserted through the first and second through-holes such that the LED heat sink 200 is combined with the bottom frame 150.

Alternatively, referring to FIG. 7C, the second portion 203 of the LED heat sink 200 is attached to the lower portion of the bottom portion of the bottom frame 150 using an adhesive element, for example, a double coated tape such that the LED heat sink 200 is combined with the bottom frame 150

It will be apparent to those skilled in the art that various modifications and variations can be made in the exemplary embodiments of the present invention without departing from the spirit or scope of the invention. Thus, it is intended that the invention cover the modifications and variations of this invention provided they come within the scope of the appended claims and their equivalents.

What is claimed is:

1. A liquid crystal display device, comprising:
a liquid crystal panel;
a light guide plate disposed under the liquid crystal panel;
a light emitting diode (LED) assembly disposed at a side of the light guide plate and including an LED and a printed circuit board (PCB), the LED arranged on the PCB to face the light guide plate;
an LED heat sink surrounding the LED assembly and including a first portion, where the PCB is attached, and a second portion covering a bottom surface of the PCB;
a bottom frame disposed under the light guide plate and including a bottom portion and a side portion, the bottom portion contacting the second portion of the LED heat sink, the bottom frame formed of an electrolytic galvanized iron (EGI);
a top frame surrounding edges of the liquid crystal panel; and
a main frame surrounding sides of the liquid crystal panel and combining with the top and bottom frames.

2. The device according to claim 1, further comprising a reflective sheet under the light guide plate and on the bottom frame, wherein the second portion of the LED heat sink 200 contacts the reflective sheet.

3. The device according to claim 2, wherein the second portion of the LED heat sink is attached to the bottom portion of the bottom frame using a double coated tape.

4. The device according to claim 1, further comprising an optical sheet under the liquid crystal panel and on the light guide plate.

5. The device according to claim 1, wherein the LED heat sink is formed of aluminum (Al).

6. The device according to claim 1, wherein the bottom portion of the bottom frame has a single terraced shape, and the second portion of the LED heat sink is disposed on a lower portion of the single terraced shape.

7. The device according to claim 6, wherein an end of the second portion of the LED heat sink corresponds to a boundary of the lower portion of an upper portion of the single terraced shape to form a flat top surface.

8. The device according to claim 1, wherein the LED heat sink further includes a third portion parallel to the second portion and covering a top surface of the PCB.

9. The device according to claim 8, wherein the third portion further covers an edge of the light guide plate.

10. The device according to claim 8, wherein the LED heat sink has a "C" shape.

11. The device according to claim 1, wherein the LED heat sink has a length being substantially equal to the LED assembly.

12. The device according to claim 1, wherein the LED heat sink has an "L" shape.

13. The device according to claim 1, wherein the LED heat sink further includes a hook extending from the first portion, and the main frame includes a hook hole where the hook is inserted.

14. The device according to claim 1, wherein the LED heat sink further includes a first through-hole on the second portion, and the bottom portion of the bottom frame includes a second through-hole, wherein a fixing element is inserted into the first and second through-holes.

15. The device according to claim 1, wherein one side of the bottom frame is opened, and the first portion of the LED heat sink covers the one side.

* * * * *